United States Patent [19]

Yagishita et al.

[11] Patent Number: 4,944,870

[45] Date of Patent: Jul. 31, 1990

[54] AUTOMATIC FILTRATION DEWATERING SYSTEM

[75] Inventors: Aisaburo Yagishita, Nagoya; Yasunori Iriyama, Iwakura; Jouichiro Osuga, Nagoya, all of Japan

[73] Assignee: Kabushiki Kaisha Yagishita, Tokyo, Japan

[21] Appl. No.: 313,342

[22] Filed: Feb. 21, 1989

Related U.S. Application Data

[63] Continuation of Ser. No. 844,198, Mar. 26, 1986, abandoned.

[30] Foreign Application Priority Data

Mar. 27, 1985 [JP] Japan .................. 60-060773

[51] Int. Cl.$^5$ .................. B01D 33/044; B01D 33/82; B01D 33/70
[52] U.S. Cl. .................. 210/103; 210/134; 210/137; 210/138; 210/143; 210/145; 210/147; 210/387; 210/400
[58] Field of Search .................. 210/91, 103, 105, 134, 210/137, 138, 139, 141, 145, 147, 387, 400, 739, 741

[56] References Cited

U.S. PATENT DOCUMENTS

| | | | |
|---|---|---|---|
| 2,867,326 | 1/1959 | Hirs | 210/138 |
| 3,731,808 | 5/1973 | Rickert | 210/387 |
| 4,233,157 | 11/1980 | Miller | 210/137 |
| 4,477,350 | 10/1984 | Brandt et al. | 210/387 |

Primary Examiner—W. Gary Jones
Attorney, Agent, or Firm—Lowe, Price, Leblanc, Becker & Shur

[57] ABSTRACT

An automatic filtration dewatering system includes a cover to which a filtration raw liquid supply pipe and a pressure air supply pipe are connected. A plate having a filter medium support and a filtrate exhaust pipe is selectively closed by a cover with a pneumatic cylinder vertically moving said cover. Filter medium moving rollers are provided on both sides of the cover and plate, and a sheet-like long filter medium is stretched over said rollers for movement a predetermined distance per one step of filtration. The improvement in the system comprises a control device functioning to: (1) operate the pneumatic cylinder just after receiving a starting signal to close the cover and said plate, (2) supply raw liquid after the closed condition is detected and a predetermined closed time elapses to start filtration, (3) stopping supply of raw liquid at the earlier time either when pressure of said raw liquid in said cover has reached a predetermined value or a predetermined filtration time has elapsed, (4) supplying pressurized air into the cover, (5) stopping supply of pressurized air when air pressure in said cover is lower than a predetermined value after a predetermined filtrate discharging time has elapsed, (6) operating the pneumatic cylinder to separate the cover from the plate, and (7) detecting a separate position of the cover by means of a limit switch to generate a signal for starting movement of the filter medium.

1 Claim, 1 Drawing Sheet

AUTOMATIC FILTRATION DEWATERING SYSTEM

This application is a continuation of application Ser. No. 06/844,198, filed Mar. 26, 1986, abandoned.

BACKGROUND OF THE INVENTION

The present invention relates to a filter for filtering suspension under pressure and discontinuously exhausting a filter cake having low content of a mother liquor.

In a well-known filter system, a filter cloth is disposed on a filter plate provided on the upper surface of a flat filter medium support, and a cover arranged above the filter plate is brought into tight contact with the circumferential portion of the filter plate. Then, suspension is supplied under pressure to a space defined between the cover and the filter cloth to carry out filtration. When filtration efficiency is reduced because of stacking of a filter cake on the filter cloth, supply of the suspension is stopped, and pressure air is supplied to reduce mother liquor content of the filter cake. Then, the cover is separated from the filter plate to remove the filter cake as well as the filter cloth. Further, in another well-known filter system, a long filter cloth is used, and a predetermined length of the filter cloth is moved every time filtering operation is carried out to thereby remove the filter cake. Furthermore, the operation of separating the cover from the filter plate is carried out by using a fluidic cylinder.

It has been proposed that such a filtration dewatering system is intended to be operated automatically with no hands. However, the conventional automatic operating system is generally a sequence control system wherein an operating signal is simply generated and stopped according to lapse of a set time, or a sequence control system wherein a sensor for detecting the end of the operation of the system is used, and after one step terminates, the subsequent step automatically starts.

On the other hand, the use of pneumatic equipment is greater in comparison with a hydraulic equipment because of easiness of piping for fluid and reduced pollution to working environment irrespective of the disadvantage that the pneumatic equipment is low in response speed and power output. When using pneumatic equipment, it is necessary to make the cylinder large to reduce the foregoing disadvantages and correspondingly to make air pipings and valves still larger, which results in economical disadvantages. Further, control speed is limited because of slow response.

SUMMARY OF THE INVENTION

It is an object of the present invention to provide means for securely and efficiently controlling operation of a filtration dewatering system designed to be operated electrically and pneumatically.

According to the present invention, in an automatic filtration dewatering system including a cover to which a filtration raw liquid supply pipe and a pressure air supply pipe are connected, a plate having a filter medium support engaged with an upper surface thereof and a filtrate exhaust pipe, a pneumatic cylinder for vertically moving said cover to bring said cover into contact with said plate or separate said cover from said plate, a plurality of filter medium moving rollers provided on both sides of said cover and said plate, and a sheet-like long filter medium stretched over said rollers and adapted to be moved by a predetermined distance per one step of filtration, said filter medium being temporarily fixedly held between the circumferential portion of said cover and the circumferential portion of said plate; the improvement comprising a control device functioning to operate said pneumatic cylinder just after receiving a starting signal to close said cover and said plate, supplying raw liquid after such closed condition is detected and a predetermined closed time is elapsed to start filtration, stopping supply of said raw liquid at the earlier time either when pressure of said raw liquid in said cover has reached a predetermined value or a predetermined filtration time has been elaspsed, supplying pressure air into said cover, stopping supply of said pressure air when air pressure in said cover is lower than a predetermined value after a predetermined filtrate discharging time has been elaspsed, operating said pneumatic cylinder to separate said cover from said plate, and detecting a separate position of said cover by means of a limit switch to generate a signal for starting movement of said filter medium.

The automatic filtration dewatering system of the present invention is securely operated according to slow response speed even if an air compressor having small capacity is used, or pressurized air supplied through a narrow piping is employed. Therefore, there hardly occurs an accident or the like to improve operational efficiency and obtain an economic system.

The invention will be more fully understood from the following detailed description and appended claims when taken with the drawings.

DETAILED DESCRIPTION OF THE PREFERRED EMBODIMENT

Figure 1:
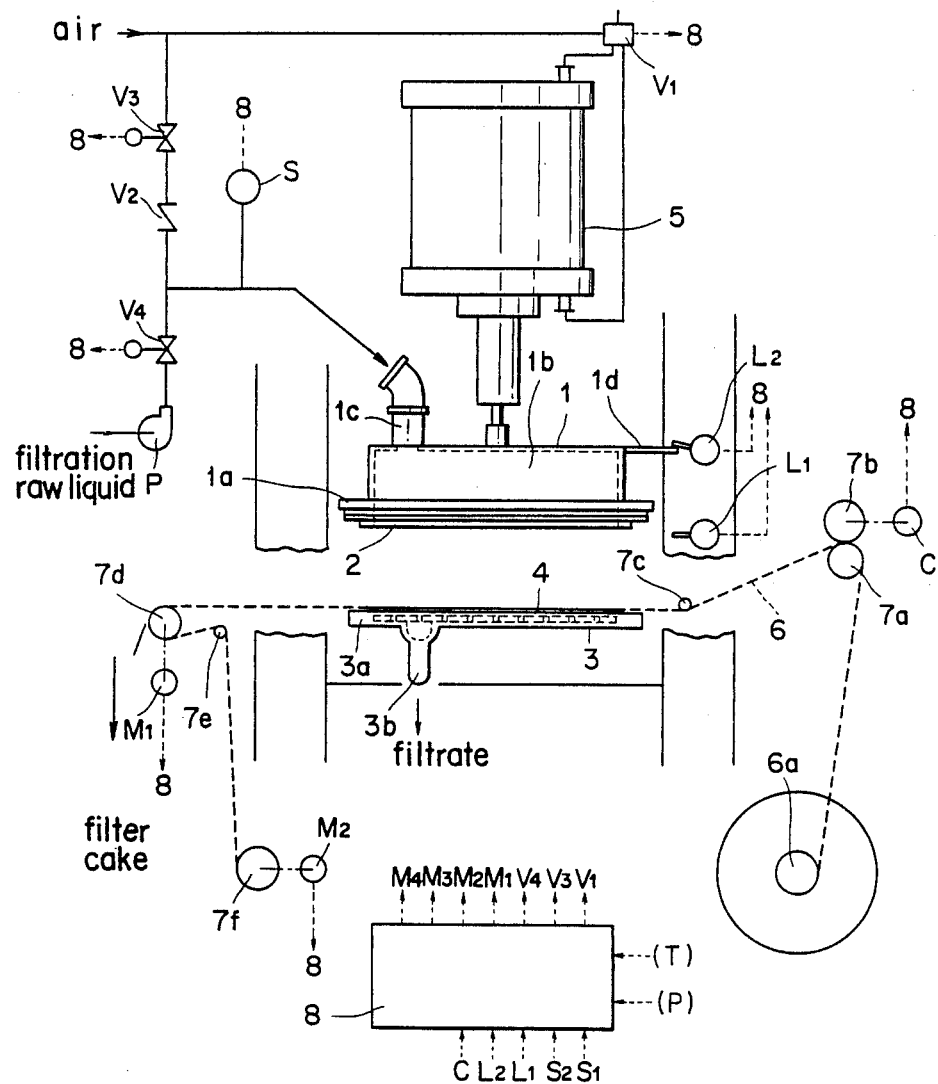
FIG. 1 is an illustration showing the automatic filtration dewatering system according to the present invention.

Referring to FIG. 1, the automatic filtration dewatering system of a preferred embodiment according to the present invention includes a cover 1, an annular packing 2 attached to the lower surface of a circumferential portion 1a of the cover 1, a plate 3 having a periphery 3a and a drain pipe 3b, a filter medium support 4 mounted on the upper recessed portion of the plate 3, an air cylinder 5 and a filter paper 6. The filter paper 6 is fed from a new filter paper roll 6a between a feed roller 7a and a pinch roller 7b and a friction bar 7c onto the filter medium support 4. Then, the filter paper 6 is fed through a drawing roller 7d and a friction bar 7e to a winding shaft 7f, and is wound around the winding shaft 7f. The filtration dewatering system further includes a filter paper drawing motor $M_1$, a filter paper winding motor $M_2$ and a counter C for detecting a rotating speed of the pinch roller 7b or an amount of movement of the filter paper 6.

The air cylinder 5 is designed to vertically move the cover so as to hold the filter paper 6 between the cover 1 and the plate 3 or release the filter paper 6. There is provided a selector valve $V_1$ for selecting pneumatic air to be fed to the air cylinder 5.

A pressure air valve $V_3$ associated with a check valve $V_2$ and a raw liquid valve $V_4$ are connected with a supply pipe 1c leading to a raw liquid chamber 1b in the cover 1. The supply pipe 1c is also provided with a pressure switch S having a function of detecting high pressure and low pressure. The cover 1 is provided with a projection 1d sidewardly projecting therefrom. A limit switch $L_1$ is provided for detecting a closed position of the cover 1 by means of the projection 1d. Similarly, a limit switch $L_2$ is provided for detecting an open position of the cover 1 by means of the projection 1d.

Reference numeral 8 designates a control device for effecting automatic filtrating operation of the filtration dewatering system. The control device 8 receives a starting signal to start control operation, and further receives signals from the pressure switch S, the limit switches $L_1$ and $L_2$ and the counter C, etc. to operate timers and relays incorporated therein and generate signals for operating the motors and the valves of the filtration dewatering system.

In operation, a piping is connected from a raw liquid tank storing raw liquid to be filtered through a raw liquid pump to the filtration dewatering system, and another piping is connected from an air compressing pump through a pressure tank and a pressure reducing valve to the filtration dewatering system. Further, a filtrate recovering piping and a filter cake receiver, etc. are installed, and then an operation starting switch of the control device 8 is turned on to carry out the automatic operation as follows:

1: The selector valve $V_1$ is actuated to close the cover 1.

2: When the cover 1 reaches the closed position by the operation of the air cylinder 5, the limit switch $L_1$ generates a signal.

3: A delay timer receives the signal from the limit switch $L_1$, and is operated (Closed pressure increases in 5 seconds).

4: After a delay time is elapsed, the raw liquid valve $V_4$ is opened, and simultaneously a delay timer is operated (Operation of the valve is completed in 5 seconds).

5: After a delay time is elapsed, a power switch of the raw liquid pump P operated by motor $M_4$ is closed thereby to start filtration of the raw liquid and start operation of a filtration timer.

6. When a predetermined filtration time (180 minutes, for example) is elapsed, or a high pressure detection output $S_1$ of the pressure switch S (as designed to generate a signal at 1.5 kg/cm$^2$ and over, for example) is received, or an automatic operation stop signal is received, the power switch of the raw liquid pump P opens, and the raw liquid valve $V_4$ is closed, and simultaneously a delay timer is operated (The valve is fully closed in 3 seconds).

7: After a delay time is elapsed, the pressure air valve $V_3$ opens under operation of a motor schematically shown at $M_3$ to supply pressure air to the raw liquid chamber 1c. Further, a filtrate discharging timer starts operation.

8: After a predetermined filtrate discharging time (30 minutes, for example) is elapsed, and when a low pressure detection output $S_2$ of the pressure switch S (as designed to generate a signal at 0.3 kg/cm$^2$ or less, for example) is received, the pressure air valve $V_3$ is converted to the closed position, and simultaneously a delay timer is operated (The valve is fully closed in 15 seconds, and as the air in the raw liquid chamber 1c passes through the filter cake on the filter paper to be exhausted through the filtrate exhaust pipe 3b, pressure in the raw liquid chamber 1c becomes approximately ordinary pressure).

9: After a delay time is elapsed, the selector valve $V_1$ of the air cylinder 5 is converted in the opening direction of the cover 1.

10: The cover 1 reaches the open position, and the limit switch $L_2$ generates a signal.

11: The signal from the limit switch $L_2$ is received, and the power switches of the motors $M_1$ and $M_2$ are closed. Simultaneously, a fiter paper movement timer is operated (6 seconds).

12: When the filter paper 6 startes to be moved, the feed roller 7a and the pinch roller 7b are rotated, and the counter C detects a rotating speed of the pinch roller 7b to generate a count signal.

13. When the count signal is received during movement of the filter paper, the filter paper movement timer is once returned to start the operation again.

14: When the count signal from the counter C reaches a predetermined number, the power switches of the motor $M_1$ and $M_2$ are turned off, and the filter paper movement timer is stopped to be returned. Simultaneously, a delay timer is operated (5 seconds).

15. When the filter paper movement time is elapsed before the count signal is received, an alarm signal indicating abnormality of the filter paper is generated, and the power switches of the motors, etc. are turned off.

16: After a delay time is elapsed, the selector valve $V_1$ of the air cylinder 5 is converted in the closing direction of the cover 1.

17: When th cover 1 reaches the closed position, the limit switch $L_1$ generates a signal.

18: When an operation stop signal has not been received after the signal from the limit switch $L_1$ is received, the operation is shifted to the aforementioned step 3.

19: When the operation stop signal has been received after the signal from the limit switch $L_1$ is received, the subsequent operation is stopped to finish the automatic operation.

While the aforementioned automatic operation is wholly controlled by the control device 8, the control device 8 having such function may incorporate a microcomputer, for example. Further, as all of the control signals from the control device 8 are electric signals, the power switches of the motors, etc. are opened and closed by using any relays, and the valves, etc. are operated by electric-pneumatic conversion in this embodiment. However, the relays may be used in combination with any electrically powered valves without necessarily conducting electric-pneumatic conversion. In addition, the operating time of each delay timer in the control device 8 is required to be set in consideration of a time required for obtaining a reverse pressure durable condition after the air cylinder and the valves, etc. are operated, owing the air flow resistance in the pressure air pipings and the pressure reducing valve.

Having thus described the preferred embodiment of the invention, it should be understood that numerous structural modifications and adaptations may be made without departing from the spirit of the invention.

What is claimed is:

1. An automatic filtration dewatering system, comprising a cover to which a supply pipe is connected, a plate having a filter medium support engaged with an upper surface thereof and a filtrate exhaust pipe, a pneumatic cylinder for vertically moving said cover into and out of contact with said plate, a plurality of filter medium moving rollers provided on both sides of said cover and said plate, and a sheet-like long filter medium stretched over said rollers and means for moving the filter medium a predetermined distance per one step of filtration, said filter medium being temporarily fixedly held between a circumferential portion of said cover and a circumferential portion of said plate; and further including a control system having valve means for operating said pneumatic cylinder just after receiving a starting signal to close said cover and said plate and for generating a closed condition signal when the cover and plate are closed, pump means for supplying raw liquid for filtration via said supply pipe after such closed condition signal is detected and a predetermined closed time has elapsed, means for stopping supply of said raw liquid at the earlier time either when pressure of said raw liquid in said cover has reached a predetermined value or a predetermined filtration time has elapsed, means for supplying pressurized air through the supply pipe to the filter medium for at least a predetermined time interval and until air pressure in said cover becomes lower than a predetermined value to reduce the mother liquor content of the filter cake, pressure switch means connected to the supply pipe for detecting said predetermined values of raw liquid pressure and air pressure in said supply pipe, means for operating said pneumatic cylinder to separate said cover from said plate, and switch means for detecting a separate position of said cover by means of a limit switch to generate a signal for starting movement of said filter medium, wherein said control system further includes delay timer means for inducing said predetermined closed time to enable pressure acting to close said cover to reach a closed pressure before a supply of raw liquid is supplied into the cover for filtration.

* * * * *